U S 0 0 5 8 9 3 3 1 2 A

US005893312A

United States Patent [19]

Tianello et al.

[11] Patent Number: 5,893,312
[45] Date of Patent: Apr. 13, 1999

[54] FILM RE-SHAPING DEVICE

[75] Inventors: Dennis Francis Tianello, Spencerport; David Lawrence Rowden, Rochester, both of N.Y.

[73] Assignee: Eastman Kodak Company, Rochester, N.Y.

[21] Appl. No.: 08/752,775

[22] Filed: Nov. 20, 1996

Related U.S. Application Data

[63] Continuation of application No. 08/410,262, Mar. 24, 1995, abandoned.

[51] Int. Cl.$^6$ .................................................. B26F 11/14
[52] U.S. Cl. ............................ 83/684; 83/688; 83/694; 83/948
[58] Field of Search ........................... 83/948, 690, 691, 83/693, 694, 695, 684, 685, 686, 687, 688, 444

[56] References Cited

U.S. PATENT DOCUMENTS

| Re. 24,439 | 3/1958 | Banko | 83/685 |
|---|---|---|---|
| 2,779,408 | 1/1957 | Miller et al. | 83/33 |
| 3,248,988 | 5/1966 | Janczy | 83/260 X |
| 3,250,163 | 5/1966 | Smith | 83/691 X |
| 3,499,202 | 3/1970 | Napor et al. | |
| 3,524,370 | 8/1970 | Thompson | 83/682 X |
| 3,586,258 | 6/1971 | Horlezeder | |
| 3,608,413 | 9/1971 | Borello | 83/687 X |
| 3,677,121 | 7/1972 | Etchell | 83/620 X |
| 3,713,357 | 1/1973 | Keith | 83/444 X |
| 3,763,728 | 10/1973 | Blackman | 83/446 X |
| 3,771,402 | 11/1973 | Bernier | 83/917 X |
| 3,854,357 | 12/1974 | Kron | |
| 4,131,040 | 12/1978 | Bollmer | |
| 4,195,541 | 4/1980 | Wildner et al. | 83/824 X |
| 4,476,633 | 10/1984 | Brych | 30/368 X |
| 4,505,039 | 3/1985 | Donovan | |
| 4,957,247 | 9/1990 | Nakamura et al. | 242/67.1 R |
| 5,062,331 | 11/1991 | Michal et al. | 83/917 X |
| 5,125,630 | 6/1992 | Hoty et al. | 242/532.6 |
| 5,479,691 | 1/1996 | Shimizu et al. | 83/948 X |

FOREIGN PATENT DOCUMENTS

| 0 584 583 | 3/1994 | European Pat. Off. |
| 91/06890 | 5/1991 | WIPO |

OTHER PUBLICATIONS

Patent Abstracts of Japan, vol. 8, No. 265 (P–318) 1702, Dec. 5, 1984 & JP–A–59 135455 (Fuji Shashin Film K.K.), Aug. 3, 1984.

*Primary Examiner*—M. Rachuba
*Attorney, Agent, or Firm*—Frank Pincelli

[57] ABSTRACT

A film re-shaping device for orienting and re-shaping the end of a filmstrip in a desired configuration having, a base, an alignment post mounted on the base, an elongated metal lower die plate with an guide hole for positioning the die plate over the alignment post, formed in the desired end-of-filmstrip configuration, a film guide mounted on the die plate for aligning an edge of the filmstrip, a film edge spring for keeping the filmstrip against the film guide, a spring loaded roller attached to the base for bearing on the filmstrip and flattening the filmstrip against the die plate surface, and an elongated metal upper punch plate having an guide hole for positioning the punch plate over the alignment post and aligning the plates accurately with each other, formed at the film re-shaping end in the desired end-of-filmstrip configuration, whereby the filmstrip is captured between the upper and lower plates, is described. The device has a raised rib formed along the bottom of an outer edge of the end of the punch plate for shearing the filmstrip, removing the damaged portion of the filmstrip and re-shaping the undamaged portion of the filmstrip in the desired end-of-filmstrip configuration. A method of re-shaping the end of a filmstrip using the device is also described.

9 Claims, 4 Drawing Sheets

FILM RE-SHAPING DEVICE

This is a continuation of application Ser. No. 08/410,262, filed Mar. 24, 1995 abandoned.

FIELD OF THE INVENTION

This invention relates generally to film shaping tools, and more particularly to a device for re-shaping the end of a filmstrip which is in the form of a hand-held or table top unit having punch and die components of the desired end-of-filmstrip configuration.

BACKGROUND OF THE INVENTION

Currently the leading and trailing ends of photographic film, such as 35 mm film, are square cut during splicing and heat seal splicing tape is applied to join the filmstrips together for continuous processing and printing in a large photo finishing laboratory. At finishing the filmstrip is cut into strips, for example strips of four frames, and returned to the customer along with an attached film splice label. A new photographic system is contemplated which requires the film to be returned to a cartridge, for example the customers original cartridge. This will require filmstrip geometry to be retained by reforming the end of the filmstrip after processing of the spliced film. One method of accomplishing this function is to remove the splice tape by cutting and then re-shaping the cut ends. By cutting the spliced film to remove the splice tape rather than using thermal desplicing methods, concern that adhesive residue on the film ends is being returned to the customer which might cause a future problem in the cartridge is eliminated.

As part of the attachment or detachment process for films, it may be required for the photographic system to accurately and reliably sense the physical end of a filmstrip. This may be necessary to insure that the filmstrip is completely unwound from a film cartridge prior to the detachment operation or the filmstrip is fully positioned prior to an attachment operation. For these functions, the exposed image area of the filmstrip is not important. Most film features (i.e. perforations and holes) are intended as features that identify individual exposure frames or the end of the exposure area and not the physical end of the filmstrip. Technologies exist to sense tension in a web or film features that relate to the exposure area of a film but both schemes are deficient in that sensing of the physical end of the filmstrip is not absolutely confirmed.

U.S. Pat. No. 3,499,202 discloses a machine for cutting a continuous roll of unexposed movie film into controlled lengths for loading into film cartridges and re-shaping the leading and trailing ends of the cut film to facilitate its loading into a cartridge. A punching assembly is provided which simultaneously punches the leading end of the rolled filmstrip and the trailing end of the next filmstrip to be rolled.

U.S. Pat. No. 3,586,258 discloses a method and an apparatus for loading unexposed photographic film in tape form into a cassette. After a length of film is wound onto the cassette the film is stopped and cut to provide a trailing end for the film in the cassette and a leading end of new film to be inserted in a new cassette. A punch is provided for punching the leading end to provide an anchoring means for attaching to the cassette spool.

U.S. Pat. No. 3,854,357 discloses a method and an apparatus for removing an imperfect portion of a web to form trailing and leading web portions, and splicing the web portions to form a continuous perfect web. The apparatus comprises knife blades for separating the imperfect portion and a guiding member for aligning the leading web end with the trailing web end in position to be spliced.

U.S. Pat. No. 4,131,040 discloses an apparatus, for forming holes in the end of a printing blanket, in the form of a template having a locating hole for disposing around a locating pin, holes for receiving a punch, and a clamp for clamping the template against the blanket at a location remote from the locating pin.

U.S. Pat. No. 4,505,039 discloses a seaming tool, for trimming the ends of adjoining floor covering materials to form a joint, in the form of a template which is positioned over the material to be trimmed. A stop is provided to position the template along an end of already laid floor covering and the edge of the material to be trimmed is manually trimmed against the edge of the template.

In the present application the term "end-locating distance" defines a length corresponding to the distance, in a photographic film having a filmstrip exposure area on a portion of the film and a filmstrip trailing end, which is greater than the length of the filmstrip remaining inside a corresponding film cartridge with a spool core to which the trailing end is attached when the film is fully withdrawn and is still attached to the spool core and less than the distance from the end of the exposure area to the physical end of the filmstrip trailing end.

SUMMARY OF THE INVENTION

Briefly stated and in accordance with one aspect of this invention there is provided a film re-shaping device having a film aligning end and a film re-shaping end for re-shaping the end of a filmstrip having a damaged end portion attached to an undamaged portion of the filmstrip in a desired configuration comprising, a base for mounting the device thereon, an alignment post mounted on the base, an elongated metal lower die plate contacting the base, having a guide hole for positioning the die plate over the alignment post, formed at the film re-shaping end in the desired end-of-filmstrip configuration, for receiving the under managed portion of the filmstrip in need of re-shaping, a film guide mounted on the die plate adjacent to a first longitudinal edge of the plate for aligning an edge of the filmstrip, a film edge spring attached to the base at the film aligning end of the device adjacent to a second longitudinal edge of the die plate for keeping the filmstrip against the film guide, a spring loaded roller attached to the base at the film aligning end of the device adjacent to the second longitudinal edge of the die plate for bearing on the filmstrip and flattening the filmstrip against the die plate, and an elongated metal upper punch plate contacting the die plate having a guide hole for positioning the punch plate over the alignment post and aligning the plates accurately with each other, formed at the film re-shaping end in the desired end-of-filmstrip configuration, the punch plate further comprising a raised rib formed along the bottom of an outer edge of the film re-shaping end of the punch plate for cooperating with an outer edge of the die plate to shear the filmstrip, whereby upon full actuation of the punch plate against the die plate the damaged portion of the filmstrip is removed and the undamaged portion of the filmstrip is re-shaped in the desired end-of-filmstrip configuration.

In another aspect of the invention the device is provided with a locating feature protruding upwards from the die plate surface adjacent to a longitudinal edge, for engaging a locating hole in the filmstrip and positioning the filmstrip.

In another aspect of the invention the device is provided with features protruding below the film re-shaping end of the punch plate and matching apertures formed in the film re-shaping end of the die plate, whereby the protruding features cooperate with the matching apertures to pierce the filmstrip and form perforations.

In another aspect of the invention the device is provided with a second punch protruding from the bottom of the punch plate located at an end-locating distance from the rib at the re-shaping end of the device for perforating the filmstrip to form an end-of-filmstrip perforation for positively confirming a physical end of the re-shaped filmstrip, in addition the die plate has a corresponding end-locating aperture for cooperating with the second punch.

In another aspect of the invention there is provided a device for re-shaping the trailing end of a filmstrip and providing an end-locating end-of-filmstrip perforation for positively confirming a physical end of the re-shaped filmstrip comprising; an elongated metal lower die plate having a re-shaping end formed in a desired end-of-filmstrip configuration and an end-locating aperture formed in a first edge of the die plate at an end-locating distance from the re-shaping end, for receiving the filmstrip in need of re-shaping, a locating feature protruding upwards from the die plate surface adjacent to the first edge, for engaging a locating hole in the filmstrip and positioning the filmstrip, and an elongated metal upper punch plate contacting the die plate having a raised rib formed along the bottom of an outer edge of the film re-shaping end of the punch plate in the desired end-of-filmstrip configuration for cooperating with the re-shaping end of the die plate to shear the filmstrip, and a second punch protruding from the first edge of the punch plate at an end-locating distance from the rib for cooperating with the end-locating aperture to perforate the filmstrip, whereby upon full actuation of the punch plate against the die plate the filmstrip is re-shaped and provided with an end-locating perforation for positively confirming the physical end of the filmstrip.

In another aspect of the invention there is provided a method for re-shaping the end of a filmstrip having a damaged end portion attached to an undamaged portion of the filmstrip comprising the steps of: capturing the undamaged end of the filmstrip in a film re-shaping device comprising, a film aligning end and a film re-shaping end for re-shaping the end of a filmstrip in a desired configuration, the device further comprising, a base for mounting the device thereon, an alignment post mounted on the base, an elongated metal lower die plate contacting the base, having a guide hole for positioning the die plate over the alignment post, formed at the film re-shaping end in the desired end-of-filmstrip configuration, for receiving the undamaged portion of the filmstrip in need of re-shaping, a film guide mounted on the die plate adjacent to a first longitudinal edge of the plate for aligning an edge of the filmstrip, a film edge spring attached to the base at the film aligning end of the device adjacent to a second longitudinal edge of the die plate for keeping the filmstrip against the film guide, a spring loaded roller attached to the base at the film aligning end of the device adjacent to the second longitudinal edge of the die plate for bearing on the filmstrip and flattening the filmstrip against the die plate, and an elongated metal upper punch plate contacting the die plate having a guide hole for positioning the punch plate over the alignment post and aligning the plates accurately with each other, formed at the film re-shaping end in the desired end-of-filmstrip configuration, the punch plate further comprising a raised rib formed along the bottom of an outer edge of the film re-shaping end of the punch plate for cooperating with an outer edge of the die plate to shear the filmstrip; actuating the punch plate against the die plate; and shearing off the damaged end portion to form the desired end-of-filmstrip shape.

In another aspect of the invention there is provided a method, in which the device further comprises features protruding below the film re-shaping end of the punch plate and matching apertures formed in the film re-shaping end of the die plate, whereby the protruding features cooperate with the matching apertures to pierce the filmstrip and form perforations, further comprises the step of perforating the filmstrip at the desired locations.

In another aspect of the invention there is provided a method for re-shaping the trailing end of a filmstrip and providing an end-locating end of filmstrip perforation for positively confirming a physical end of the re-shaped filmstrip comprising the steps of: capturing the trailing end of the filmstrip in a film re-shaping device comprising, an elongated metal lower die plate having a re-shaping end formed in a desired end-of-filmstrip configuration and an end-locating aperture formed in a first edge of the die plate at an end-locating distance from the re-shaping end, for receiving the filmstrip in need of re-shaping, a locating feature protruding upwards from the die plate surface adjacent to the first edge, for engaging a locating hole in the filmstrip and positioning the filmstrip, and an elongated metal upper punch plate contacting the die plate having a raised rib formed along the bottom of an outer edge of the film re-shaping end of the punch plate in the desired end-of-filmstrip configuration for cooperating with the re-shaping end of the die plate to shear the filmstrip, and a second punch protruding from the first edge of the punch plate at an end-locating distance from the rib for cooperating with the end-locating aperture to perforate the filmstrip; actuating the punch plate against the die plate; shearing off the end of the filmstrip to form the desired end-of-filmstrip shape; and perforating the filmstrip to form the end-locating end-of-filmstrip perforation.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Although different film sizes can be used with the device of this invention, the invention is disclosed as being embodied preferably for re-shaping film for loading in a 35 mm-like cartridge (cassette) or for use with associated photo finishing equipment. Because such a film and equipment are well known, this description is directed in particular to photographic elements forming part of or cooperating directly with the disclosed embodiment. However, other film sizes also fall within the invention. It is to be understood, however, that other elements not specifically shown or described may take various forms known to persons of ordinary skill in the art.

A filmstrip which is in need of re-shaping typically has a damaged end which is attached to the undamaged portion of the filmstrip. The filmstrip is positioned in the film re-shaping device so that the undamaged portion is accurately aligned at one end and the damaged end extends beyond the re-shaping end of the device. The re-shaping operation severs the film and the damaged portion is discarded and simultaneously the new end of the undamaged portion of the filmstrip is re-shaped in the desired configuration. For exemplary purposes a re-shaping device for use in forming a filmstrip with a trailing end of film configuration with appropriate cut-out features is illustrated in FIG. 1.

The device of this invention is designed for use in re-shaping and re-forming the ends of filmstrips which are not simply square cut to give a rectangular shaped end as used, for example, in splicing operations. Square cut ends can be readily formed by cutting with a blade or guillotine like devices. Templates of this invention provide filmstrip ends featuring, for example, tapered, arcuate and other non-rectangular shapes, with and without notches or perforations.

Figure 1:
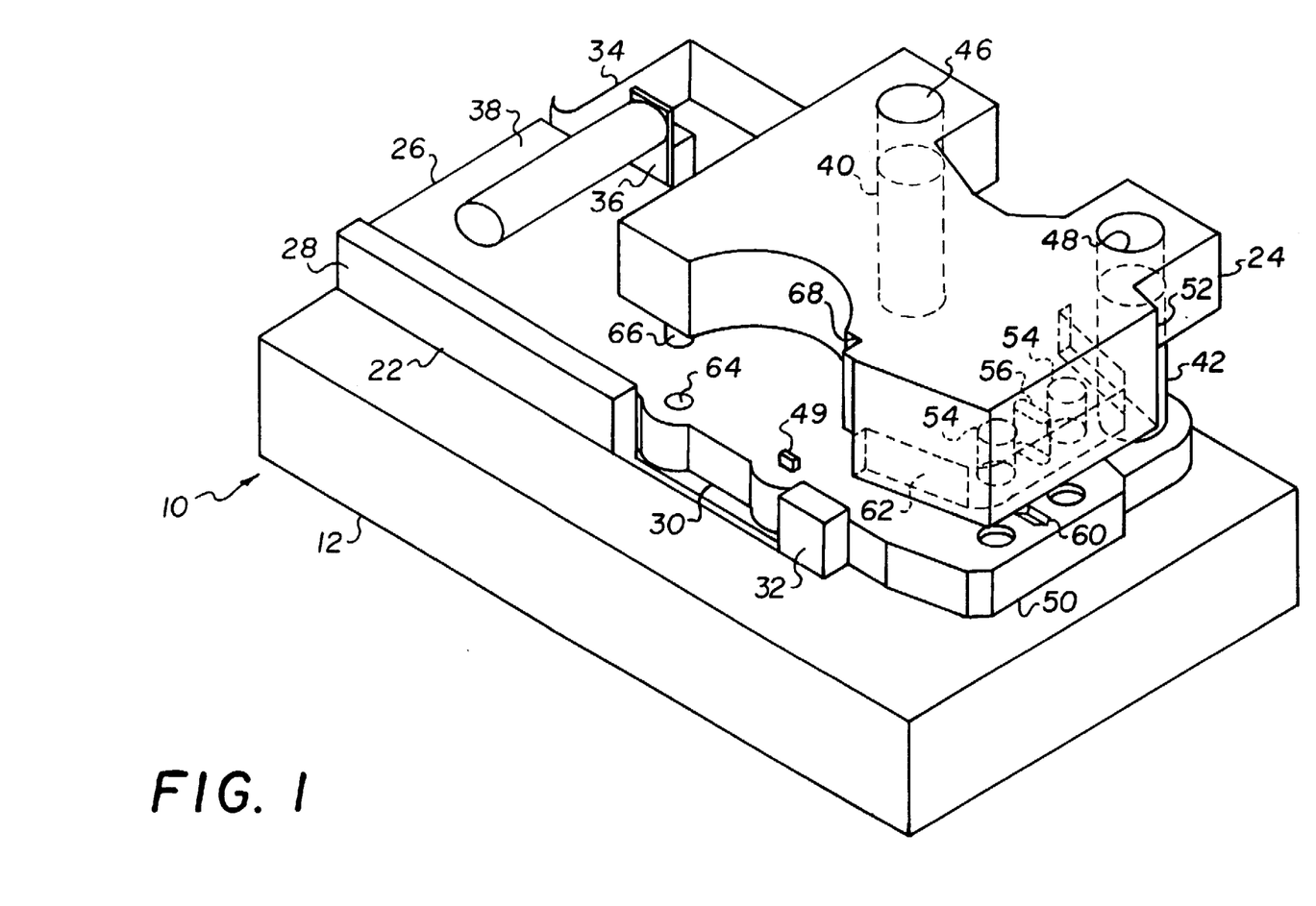
FIG. 1 illustrates a film re-shaping device of the invention.

Referring to FIG. 1 an example of the film re-shaping device 10 is shown which is, preferably, generally rectangular in shape and includes a base 12, a lower die plate 22 and an upper punch plate 24. At one end 26 of the die plate 22 a first film guide 28 is mounted on the die plate adjacent to a first longitudinal edge 30. In a preferred embodiment a second film guide 32 is mounted on the same edge spaced at a distance from the first film guide. The filmstrip to be re-shaped is held against these guides 28, 32 by a film edge spring 34 which is attached to the base adjacent to a second longitudinal edge 36 of the die plate. A spring loaded roller 38 for controlling film curl is attached to the base adjacent to the second longitudinal edge of the die plate so that the roller extends over and bears against the filmstrip and flattens the filmstrip against the die plate surface.

Figure 2:
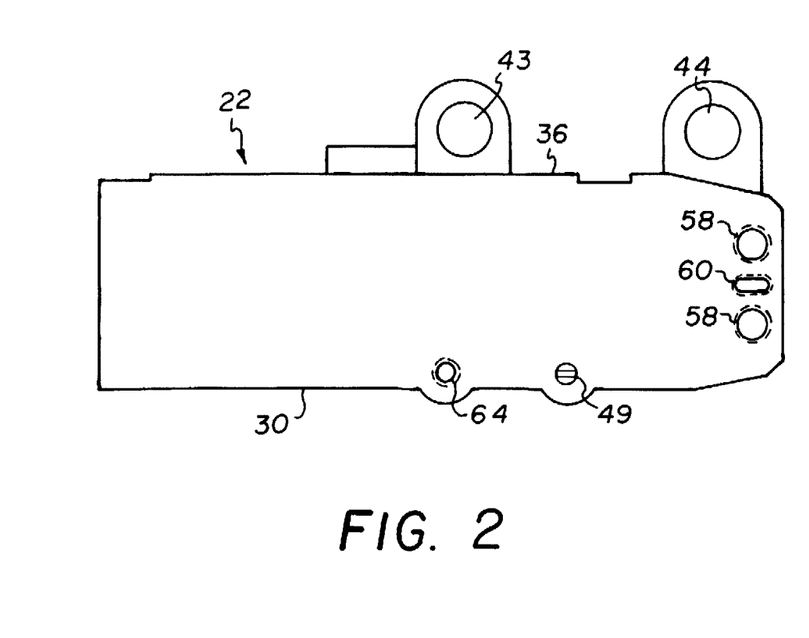
FIG. 2 is a partial top view of the die component of the device.
Figure 3:
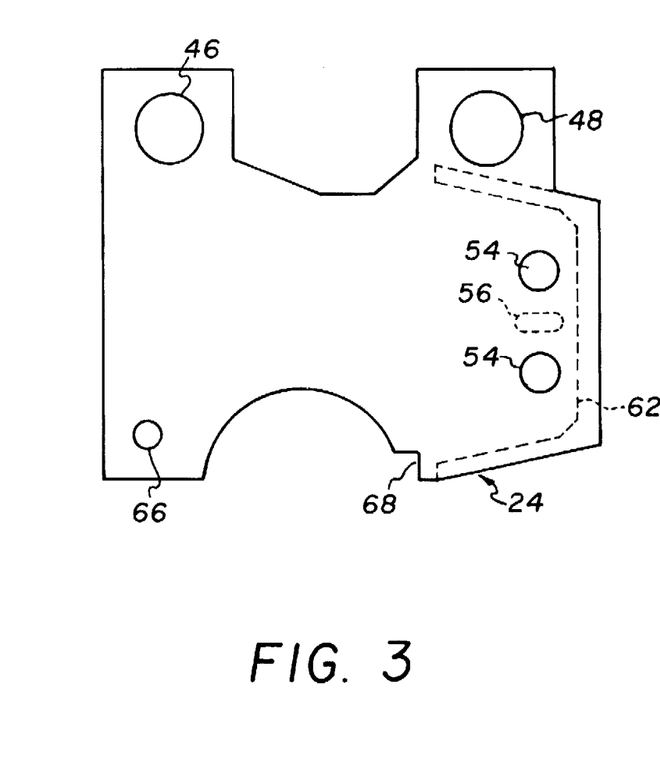
FIG. 3 is a partial top view of the punch component of the device.

Referring now to FIGS. 1, 2 and 3 the base 12 has two alignment posts 40 and 42 mounted thereon which insert into the corresponding guide holes 43, 44 in the die plate (FIG. 2) and corresponding guide holes 46, 48 in the punch plate 24 (FIGS. 1 and 3). The posts can be an integral part of the base or the base can be provided with corresponding recesses for mounting separate posts into, for example, by press fitting. Although the device shown has two alignment posts a device with one alignment post, for example a rectangular shaped post, or a device with more than two posts can also be designed to align punch and die plates with corresponding apertures. A locating pin 49 protruding from the surface of the die plate between the film guides 28, 32 engages a hole or perforation in the edge of the filmstrip and helps to position the filmstrip for the reshaping operation.

Figure 4:
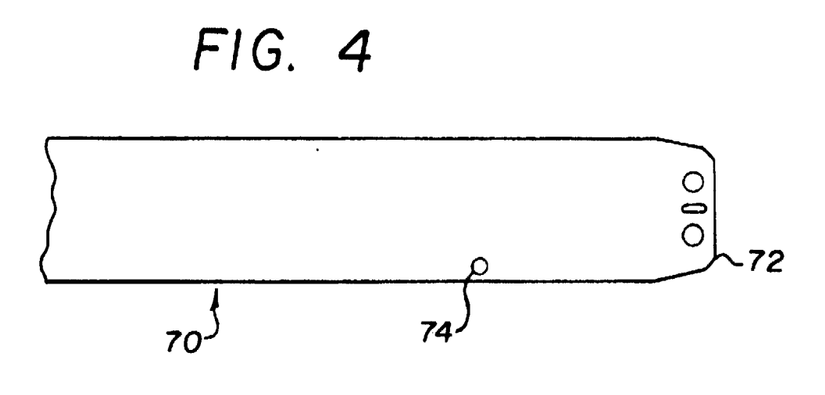
FIG. 4 illustrates a filmstrip with an end-of-filmstrip configuration.

The film re-shaping end 50 of the die plate is shaped in the desired configuration. Depending on the design requirements of the particular end being re-shaped the die plate and punch plate are provided with matching features for shaping and/or perforating the end of the filmstrip in the desired configuration. In one embodiment of the invention the device of FIGS. 1-3 and the filmstrip shown in FIG. 4 illustrate a desirable trailing end configuration for re-shaped 35 mm-like film which is useful in some photographic systems for attaching and detaching operations of a filmstrip with a film holder. In this embodiment of the re-shaping device the end of each plate is tapered down towards the end, the narrow end of the taper is at right angles to the long axis of the plate, and the protruding features and apertures are adjacent to and aligned parallel with the narrow end. In a preferred configuration, for attaching the film strip to a film holding device the protruding features and apertures at the end of the filmstrip are circular or generally obround shaped and form a row of a generally obround-shaped post (or slot) between two round posts (or circular holes).

Referring to FIG. 4, there is shown an example of a filmstrip 70 having an end 72 with a desired trailing end configuration and in which a film feature, for example, a perforation hole, 74 is located at a pre-selected end-locating distance from the physical end of the filmstrip to form an end-locating end-of-filmstrip perforation.

Referring again to FIGS. 1, 2 and 3, the re-shaping end 52 of the punch plate is provided with protruding features, round posts 54 and a generally obround-shaped pin 56, while the corresponding end 50 of the die plate is provided with corresponding matching apertures, round apertures 58, and a generally obround-shaped slot 60 for receiving and cooperating with the posts 54 and the pin 56. A raised rib 62 is formed along a portion of the outer edge of the punch plate end 52 in the shape of the desired end of film configuration which matches the configuration of the corresponding end 50 of the die plate.

In one embodiment of the device for re-shaping the trailing end of a filmstrip the die plate 22 is provided with an end-locating aperture 64 at an end-locating distance from the re-shaping end of the die. The punch plate is provided with a second punch 66 for cooperating with the end-locating aperture 64. The end-locating aperture 64 and second punch 66 are located more remotely from the re-shaping end of the die plate than the locating pin 49. Activation of the punch plate against the die plate will cause second punch 66 to perforate the filmstrip and provide a perforation at an end-locating distance from the physical end of the re-shaped film. In certain photographic systems this end-locating end-of-filmstrip feature is useful for positioning the film for attachment and detachment operations. A description of a photographic film with such an end-locating end-of-filmstrip feature is described below.

Referring again to FIG. 2 there is illustrated a top view of the die plate 22 configured for a trailing end-of-filmstrip configuration. The locating pins 49 and the end-locating aperture 64 are located adjacent to the first longitudinal edge 30. The guide holes 43, 44 are located adjacent to the second longitudinal edge 36. The apertures 58, 60 for use in forming the end of film perforations for attaching a filmstrip to a film holder are shown.

Referring again to FIG. 3 there is illustrated a top view of the punch plate 24 configured for the same trailing end-of-filmstrip configuration as shown in FIG. 2. The end-locating post 66 and the guide holes 46, 48, are located adjacent to the edges of the punch plate for cooperating with the corresponding features in the die plate. The posts 54 and pin 56 for forming the end-of-filmstrip perforations for attaching a film to a film holder are shown. The profile of the raised rib 62 for shearing off the damaged end of the film and forming the desired end-of-filmstrip shape is also shown.

Referring to FIGS. 1 and 3 a shoulder 68 is formed in the edge of the punch plate to allow the locating pin 49 to protrude through the filmstrip without contacting the punch plate.

In a preferred embodiment of the device accommodation is made for a stripper plate (not shown) of flexible material to be attached to the punch plate and used, according to well known techniques, for releasing the film after the re-shaping operation is completed. The stripper plate corresponds in shape to the end-of-filmstrip configuration and is located around the corresponding piercing components of the punch plate.

FIGS. 4–7 describe film for use in advanced photographic systems having a feature that is directly associated with the end of a trailing end filmstrip for positioning the physical end of the filmstrip prior to an attachment or detachment operation.

Figure 5:
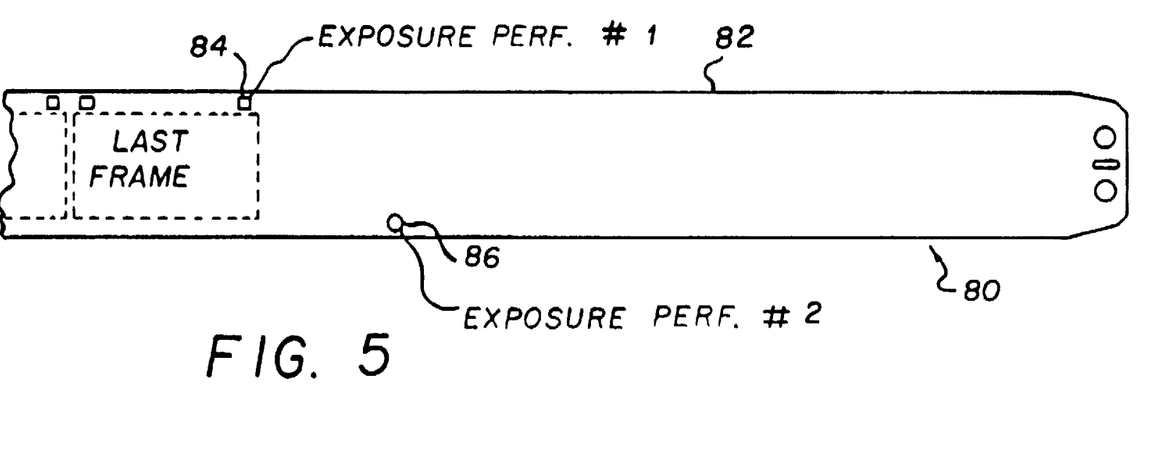
FIG. 5 illustrates an example of a film with exposure area film features.

Referring to FIG. 5, an example of a film 80 with known exposure features is shown. The trailing end of the filmstrip 82 has first and second exposure features in the form of perforations 84 or 86 at locations adjacent to the edges of the filmstrip which are directly related to the exposure area of the filmstrip and signal to a camera or photo finishing equipment that the last exposed frame has been reached. These perforations are preformed during manufacture of the unexposed film. Because of film damage which can result from abuse or necessary processing operations it is sometimes necessary to re-shape or re-form the physical end of the filmstrip so that the film can be reattached to a film holding device. This is accomplished by positioning the filmstrip in a film re-shaping device which can re-form the end of the film by cutting off the damaged end and re-shaping and perforating the filmstrip in the desired end of film configuration. When this is done the film is shortened and the relationship between the exposure area features and the physical end of the filmstrip changes. Thus an exposure feature cannot be used by itself to determine the physical end of the filmstrip.

Referring to FIG. 4, there is shown an example of a filmstrip 70 having a trailing end 72 in which a film feature, for example, a perforation hole 74 is located at a precise, end-locating distance from the physical end of the filmstrip to form an end-locating end-of-filmstrip perforation. The perforation is located at distance from the end of the filmstrip which is short of the film exposure area and greater than the length of film remaining inside a corresponding film cartridge when the film is fully withdrawn and is still attached to the spool core. Thus the perforation is outside the cartridge and can be detected by a sensor for determining the physical end of the filmstrip. The feature may have any suitable shape or dimension, for example, a circular hole or a generally rectangular-shaped slot, which can be located by a sensor. In a preferred embodiment of the invention the end-locating feature is in the form of a circular perforation. In this embodiment of the filmstrip, the end of the filmstrip is tapered down towards the end, the narrow end of the taper is at right angles to the long axis of the filmstrip and a row of perforations at the end of the filmstrip are adjacent to and aligned parallel with the narrow end. The row of perforations can be attached to a film holding device. In a preferred configuration, for attaching the filmstrip to a film holding device, for example, a spool core of a cartridge, the perforations at the end of the filmstrip are circular or generally obround-shaped and form a row of a generally obround-shaped slot between two circular holes.

The sensor can be any suitable device, for example an optical sensor or equivalent device, which senses the presence of the end of filmstrip perforation and signals a logic or control device to activate a piece of equipment for use in attaching or detaching the filmstrip.

When it is necessary to re-shape or re-form the end of the filmstrip a new end-locating end-of-filmstrip perforation would be created and located at the same end-locating distance from the new end of the filmstrip as the old end-locating perforation was from the end of the original filmstrip. The end-locating perforation is preferably located adjacent to an edge of the filmstrip. Such a location at the edge of the filmstrip is more convenient for cooperating with sensing equipment and other features on the filmstrip.

In some photographic systems the film is reloaded into the customers cartridge. When this is done it is necessary to position the filmstrip so that the correct length of film is fed into the cartridge for attaching to the spool. The end-locating end-of-filmstrip feature 74 allows accurate determination of this length and also helps align the film with the cartridge. Similarly when such a film is removed from the cartridge or a film holding device, detection of the precise position of the end of the film is needed to signal equipment used to release the film from the film holder.

Figure 6:
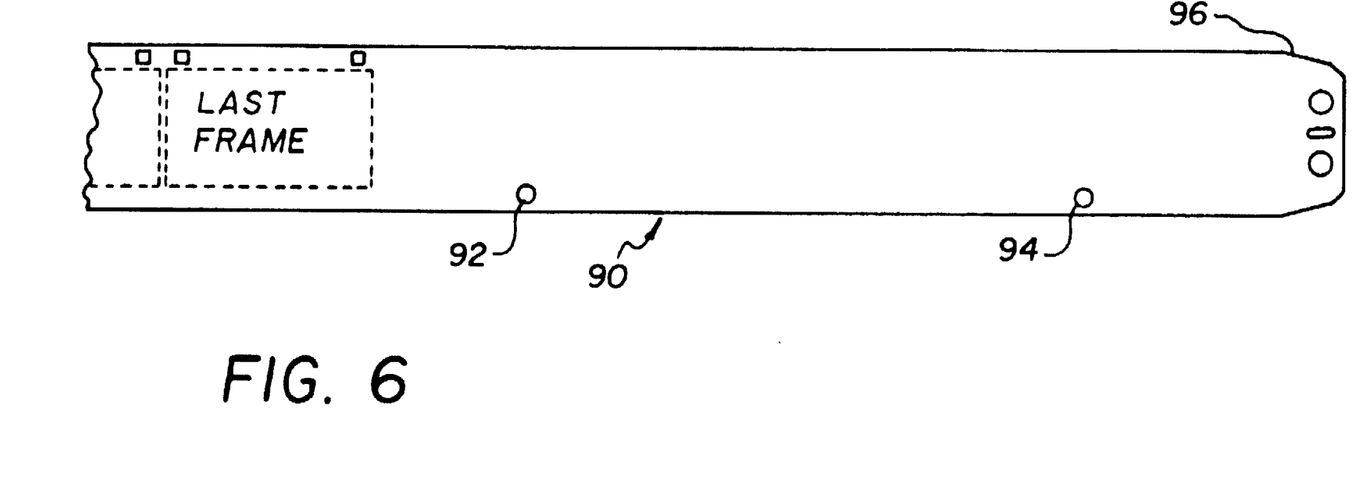
FIG. 6 illustrates a second example of a filmstrip with an end-of-filmstrip feature.

Referring to FIG. 6, there is shown am example of a film 90 in which the exposure perforation 92 and the end-locating end-of-filmstrip perforation 94 at the trailing end 96 of the filmstrip are preferably adjacent to the same edge of the film and are aligned in a longitudinal direction. The exposure perforation is more remote from the end of the film than the end-locating end-of-filmstrip perforation. In another embodiment of the invention the exposure perforation or feature serves as an anticipation feature for alerting the sensor and signaling the control device to wait until the next perforation is sensed before activating equipment. The exposure features 84 and 86, FIG. 5, can be used separately or in combination as anticipation features.

In a typical detachment operation in which the end of the film is being removed from an apparatus, such as a film cartridge or a processing spool the filmstrip would be removed using nip rollers or other known means for film removal. An optical sensor or equivalent device would sense the presence of the end-locating end-of-filmstrip perforation during the removal. The logic or control device would be programmed to stop removal of the filmstrip and the physical end of the filmstrip would be identified and positively located. Alternatively the sensor would sense the presence of the exposure perforation during the removal and the logic or control device would be programmed to wait until the next perforation, for example the end-locating end-of-filmstrip perforation, is sensed. The logic device would then stop removal of the filmstrip and the physical end of the filmstrip would be identified and positively located. The filmstrip is then detached from the apparatus by a suitable means for detaching the filmstrip end.

For some photographic systems, in order to limit the length of unused film, the end-locating end of filmstrip perforation is located, for example, at about 38 mm from the physical end of the filmstrip and centered 2 mm from the edge of the filmstrip. This allows for up to about three re-formings of a damaged end of the film, including a new end-locating end-of-filmstrip perforation, before the end of the film approaches too close to the end of the exposure area and it becomes inoperable. When an anticipation feature, for example an exposure feature, is present at the end of the exposure area then after three reforming operations the filmstrip is appreciably shorter and thus the exposure feature and the end-locating end-of-filmstrip perforation might overlap or interfere with each other.

Figure 7:
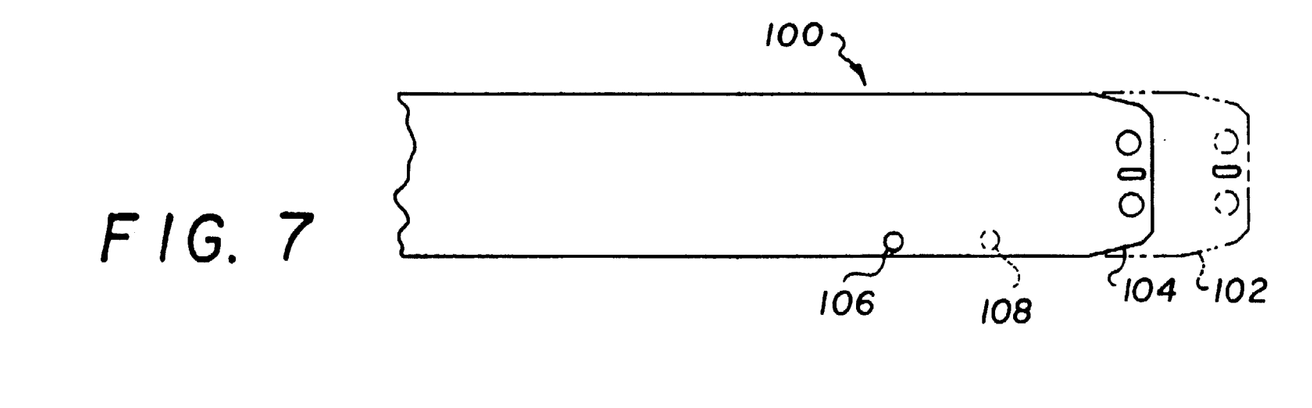
FIG. 7 illustrates a third example of a filmstrip with an end-of-filmstrip feature.

FIG. 7 illustrates a filmstrip 100 in which a damaged end 102 of the filmstrip 100 is removed and a new end 104 is re-formed. Simultaneously a new end-locating end-of-filmstrip perforation 106 is formed. The old end-locating end-of-filmstrip perforation 108 remains but no longer serves any function. Since it is between the new end-locating end-of-filmstrip perforation and the end of the filmstrip it will not interfere with subsequent sensing of the filmstrip end and reforming operations.

The above descriptions represent a device for reshaping a typical trailing end of a filmstrip. Such a device could also contain other features or perimeter outlines. Typically a leading end of a filmstrip has a generally tongue shaped profile and lacks the apertures at the end of the film. A device in which the film re-shaping ends of the punch and die plates are shaped with the leading end-of-filmstrip configuration is also contemplated by this invention. Such a device may lack some or all of the piercing features while retaining the outer edge shearing features.

The plates are preferably made of metal. Suitable metals include, for example, powder metal or metals which can be injection molded. Such metals are inexpensive and readily formed into complex shapes and patterns. Machinable metals such as, for example, carbon steel, tool steel and stainless steel can also be used. The plates can be of the same or different hardness metals. However, in a preferred embodiment the punch plate is made of harder metal than the die plate to permit a tight fit of the components. The design of the punch and die sections of this invention enables the sections to be formed and sized by inexpensive, two-piece molding techniques using metals which are suitable for molding. Powder metal is a preferred metal for such molding techniques. The selection and treatment of materials to produce components with the appropriate hardness characteristics is readily accomplished by those with skill in the field In operation of the device for re-shaping the trailing end of a filmstrip the die plate 22 is positioned over the guide posts 40, 42 by guide holes 43, 44 and the filmstrip is located on the die plate. The undamaged portion is placed over the locating pin 49 and up against the first and second film guides 28, 30 so that the damaged end extends beyond the filmstrip-reshaping end 50 of the die plate 52. In one aspect of the invention the locating pin 49, engages an existing end-locating end-of-filmstrip perforation in the end of the filmstrip to be reshaped. The film edge spring 34 provides a force that engages the filmstrip and keeps it against the film guides. The light, spring-loaded curl control roller 38 helps to flatten any cross curl in the filmstrip so as to insure positional accuracy of the filmstrip. The punch plate 24 is positioned over the guide posts 40, 42 by the guide holes 46, 48 and the filmstrip is captured between the plates. In a preferred embodiment of this invention, upon actuation of the punch plate a stripper plate attached to the punch plate comes in contact with the filmstrip and firmly holds it in place. When the punch plate is fully actuated, the rib 62 produces a shearing motion with the die plate and removes the damaged end of the filmstrip, the filmstrip is pierced by the posts 54, 56 and the filmstrip obtained has perforations and an outside shape corresponding to the desired configuration. At this point the punch plate may be retracted from the die plate, the stripper plate will release the filmstrip from the piercing components, and the filmstrip can be removed from the device. Where a stripper plate is not provided the filmstrip can still be removed by peeling it off the post.

In a preferred embodiment of the invention the piercing and shearing features of the punch plate have the exact dimensions of the final desired configuration. However, the corresponding apertures and edges of the die plate, made of softer metal, initially have additional material for contacting the punch features to ensure a tight fit. When the punch is activated against the die the additional material on the die is severed off so that there is virtually zero clearance between the features of the punch and the apertures and edges of the die.

The device is actuated by any means which provides adequate pressure to mate the components and pierce the film. Greater pressure may be needed for the initial mating of a punch with a die due to the excess material on the die. Once this has been accomplished it is preferable that the two components be kept as a matched set. Suitable actuating means include, a hydraulic press, an arbor press, a vice, parallel pliers and the like.

Similar operations are performed with a device for re-shaping the leading end of a filmstrip.

This device can be used as a table top or hand held device. Such a device can be manufactured from inexpensive components and can be used to hold a filmstrip while it is re-shaped with a desired end-of-filmstrip configuration within excellent tolerance control. It can be used by inexperienced operators with very little training When different hardnesses of the components are utilized the softer die section eventually becomes dull and can no longer effectively perform its function. Since the components are inexpensive the die plate can be discarded. A new die plate could then be used and the sizing process repeated.

While the invention has been described in connection with a presently preferred embodiment thereof, those skilled in the art will recognize that many modifications and changes may be made therein without departing from the true spirit and scope of the invention, which accordingly is intended to be defined solely by the append ed claims.

What is claimed is:

1. A re-shaping device for re-shaping a damaged end of a filmstrip having an original perforation located a pre-selected distance from an original end of the filmstrip, the device comprising:

a first punch and a die for re-shaping the damaged end of the filmstrip to form a new end;

a second punch on one of the first punch and the die for forming a perforation in the filmstrip substantially identical to the original perforation, but located the pre-selected distance from the new end; and a locating pin on the die disposed between the second punch and the new end, the locating pin adapted to be received in an opening in the die and exposed from the opening in the die to a height sufficient to engage a perforation in the edge of a filmstrip to position the filmstrip relative to the first punch and the die.

2. The device according to claim 1, having a longitudinal axis in which an end of each of the first punch and die is tapered and is at right angles to the longitudinal axis.

3. The device according to claim 2, in which the re-shaping end of the first punch comprises a row of protruding features and the re-shaping end of the die comprises a row of matching apertures, and in which each row is adjacent to and aligned parallel with the re-shaping end.

4. The device according to claim 3, in which the row of apertures comprises a generally obround-shaped slot between two round holes, for providing the filmstrip with perforations for attaching the filmstrip to a film holder.

5. The device according to claim 4, in which the row of protruding features comprises a generally obround-shaped post between two round-shaped posts.

6. The device according to claim 1, further comprising a first film guide mounted on the die adjacent to a first longitudinal edge of the die for aligning an edge of the filmstrip.

7. The device according to claim 6, further comprising a film edge spring for keeping the filmstrip against the film guide, the film edge spring adjacent to a second longitudinal edge of the die.

8. The device according to claim 2, further comprising a spring-loaded roller for bearing on the filmstrip and flattening the filmstrip against the die, the spring-loaded roller adjacent to an end of the die opposite the re-shaping end of the die.

9. A device for re-shaping a damaged end of a filmstrip having an original perforation located a pre-selected distance from an original end of the filmstrip, the device comprising:

a first punch and a die having re-shaping end for re-shaping the damaged end of the filmstrip to form a new end and having a longitudinal axis with the re-shaping end tapered relative to the longitudinal axis;

a second punch on one end of the first punch and the die for forming a perforation in the filmstrip substantially identical to the original perforation, and located the pre-selected distance from the new end; and a locating pin on the die disposed between the second punch and the new end, the locating pin adapted to be received in an opening in the die and exposed from the opening in the die to a height sufficient to engage a perforation in the edge of a filmstrip to position the filmstrip relative to the first punch and the die.

* * * * *